(12) United States Patent
Gauffin (10) Patent No.: US 11,266,922 B2
(45) Date of Patent: Mar. 8, 2022

(54) APPARATUS AND METHOD FOR ALCOHOLIC BEVERAGE DEALCOHOLIZATION

(71) Applicants: WINEMILL OY, Vantaa (FI); Sami Gauffin, Vantaa (FI)

(72) Inventor: Sami Gauffin, Vantaa (FI)

(73) Assignees: WINEMILL OY, Vantaa (FI); Sami Gauffin, Vantaa (FI)

(*) Notice: Subject to any disclaimer, the term of this patent is extended or adjusted under 35 U.S.C. 154(b) by 186 days.

(21) Appl. No.: 16/465,110

(22) PCT Filed: Nov. 29, 2017

(86) PCT No.: PCT/FI2017/050844
§ 371 (c)(1),
(2) Date: May 29, 2019

(87) PCT Pub. No.: WO2018/100247
PCT Pub. Date: Jun. 7, 2018

(65) Prior Publication Data
US 2019/0322968 A1    Oct. 24, 2019

(30) Foreign Application Priority Data
Nov. 29, 2016  (FI) ..................................... 20165906

(51) Int. Cl.
*B01D 3/00* (2006.01)
*C12H 3/02* (2019.01)
(Continued)

(52) U.S. Cl.
CPC ............... *B01D 3/00* (2013.01); *B01D 3/001* (2013.01); *B01D 3/10* (2013.01); *C12H 3/00* (2019.02); *C12H 3/02* (2019.02); *B01D 2221/02* (2013.01)

(58) Field of Classification Search
CPC . B01D 3/00; B01D 3/001; B01D 3/10; B01D 2221/02; C12H 3/00; C12H 3/02
See application file for complete search history.

(56) References Cited

U.S. PATENT DOCUMENTS 4,329,206 A * 5/1982 Cartland .................. B01D 3/02
202/177
4,570,534 A * 2/1986 Boucher .................. C12H 3/02
99/277

(Continued)

FOREIGN PATENT DOCUMENTS

CN    103695221 A    4/2014
FR    2811330 A1    1/2002
(Continued)

OTHER PUBLICATIONS

Espacenet machine translation of FR 2863625 obtained Jun. 24, 2021. (Year: 2021).*

(Continued)

*Primary Examiner* — Jonathan Miller
(74) *Attorney, Agent, or Firm* — McCoy Russell LLP (57) ABSTRACT

An apparatus for dealcoholizing alcoholic beverage comprising: a first receptacle comprising means to receive alcoholic beverage, a second receptacle comprising means receive in fluid, a third receptacle arranged to receive alcoholic beverage from the first receptacle, said third receptacle being further connected to the second receptacle, means for producing vacuum at least functionally connected to at least the third receptacle to lower pressure therein, fractionating means at least partially inside the second receptacle, the fractionating means functionally connecting the second and third receptacle, wherein the apparatus is arranged to facilitate vacuum distillation for the alcoholic beverage so that vaporizing ethanol from the alcoholic beverage travels via the fractionating means to the second so
(Continued)

that the vaporized ethanol is dissolved with the fluid in the second receptacle. Corresponding method for dealcoholization is presented.

15 Claims, 3 Drawing Sheets

(51) Int. Cl.
*B01D 3/10* (2006.01)
*C12H 3/00* (2019.01)

(56) References Cited

U.S. PATENT DOCUMENTS

| | | | | | |
|---|---|---|---|---|---|
| 4,626,437 | A | * | 12/1986 | Schobinger | C12G 3/08 426/387 |
| 5,034,238 | A | * | 7/1991 | Seidlitz | C12H 3/02 426/330.4 |
| 6,019,034 | A | * | 2/2000 | Ford, Sr. | C12H 1/16 141/65 |
| 10,226,716 | B2 | * | 3/2019 | Fabbian | B01D 3/02 |
| 10,463,983 | B2 | * | 11/2019 | Mitchell | B01D 5/0006 |
| 10,974,162 | B2 | * | 4/2021 | Kinner | B01D 5/006 |
| 2009/0159421 | A1 | * | 6/2009 | Aadland | B01D 5/006 203/11 |
| 2013/0243922 | A1 | * | 9/2013 | Lynn | A23L 2/46 426/494 |
| 2015/0132459 | A1 | * | 5/2015 | Pienaar | C12H 3/02 426/493 |
| 2016/0316802 | A1 | * | 11/2016 | Yokoyama | A23L 27/115 |
| 2017/0165589 | A1 | * | 6/2017 | Fabbian | B01D 3/001 |
| 2018/0179480 | A1 | * | 6/2018 | Kinner | B01D 3/007 |
| 2019/0255456 | A1 | * | 8/2019 | Banik | C12G 3/08 |

FOREIGN PATENT DOCUMENTS

| | | |
|---|---|---|
| FR | 2863625 A1 | 6/2005 |
| GB | 2084607 A | 4/1982 |
| WO | 2015114673 A1 | 8/2015 |

OTHER PUBLICATIONS

ISA Finnish Patent and Registration Office, International Search Report Issued in Application No. PCT/FI2017/050844, dated Feb. 13, 2018, WIPO, 5 pages.

Hui, S., "Chemical safety," Twelfth Five-Year Plan for General Higher Education, Metallurgical Industry Press, Beijing, May 1, 2012, 7 pages. (Submitted with Machine Translation).

Finnish Patent and Registration Office, Office Action Issued in Application No. 20165906, dated May 5, 2017, Helsinki, Finland, 6 pages.

Finnish Patent and Registration Office, Search Report Issued in Application No. 20165906, dated May 5, 2017, Helsinki, Finland, 1 page.

State Intellectual Property Office of the People's Republic of China, Office Action and Search Report Issued in Application No. 201780020785.0, dated Apr. 23, 2019, 15 Pages. (Submitted with Partial Translation).

State Intellectual Property Office of the People's Republic of China, Office Action and Search Report Issued in Application No. 201780020785.0, dated Nov. 11, 2019, 19 Pages. (Submitted with Partial Translation).

European Patent Office, Extended European Search Report Issued in Application No. 17875180.6, dated Jul. 1, 2020, Germany, 10 pages.

* cited by examiner

APPARATUS AND METHOD FOR ALCOHOLIC BEVERAGE DEALCOHOLIZATION

CROSS-REFERENCE TO RELATED APPLICATIONS

The present application is a U.S. National Phase of International Patent Application Serial No. PCT/FI2017/050844 entitled "APPARATUS AND METHOD FOR ALCOHOLIC BEVERAGE DEALCOHOLIZATION," filed on Nov. 29, 2017. International Patent Application Serial No. PCT/FI2017/050844 claims priority to Finnish Patent Application No. 20165906, filed on Nov. 29, 2016. The entire contents of each of the above-cited applications are hereby incorporated by reference for all purposes.

FIELD OF THE INVENTION

Generally the present invention relates to dealcoholization of alcoholic beverages. Particularly, however not exclusively, the invention pertains to an apparatus and a method for removing alcohol from a beverage, such as wine, carefully in household and restaurant conditions.

BACKGROUND

Wine is a highly appreciated product that has been produced and consumed at least since the Neolithic Era. Nowadays wine is still highly consumed and production is highly governed by regulation. Moreover, tradition plays perhaps even a bigger role in determining how wines are produced and consumed particularly in the countries with the longest roots in winemaking.

Due to climate change, the alcohol by volume (ABV) of wines has, at least in some parts of the world, steadily grown at the pace of some 1.5% increase every ten years during the last 20-30 years. This increase in ABV is a direct consequence of the grapes growing in warmer climates and hence producing more sugar, which directly affects the wine ABV. At the same time, the regulation and tradition of winemaking have made it difficult to solve the trouble with increasing ABV of wines since winemaking should utilize very little dealcoholization means and such processes that affect the essence, i.e. the taste, color and scent, of the wine.

On the other hand, for many the ethanol content of the wine is a byproduct or a catalyst for increasing the essence of the wine. Hence, the ethanol may not be wanted for its own sake. Conversely, in many cases consuming more wine with high ABV quickly leads to also a high consumption of ethanol in the wine, which has many health disadvantages. For consumers who want to enjoy the sensual and health characteristics of wine consumption has to be limited in light of the increased alcoholic content.

Many dealcoholization processes are known from the prior art. Firstly, there exist pre-fermentation and (during) fermentation biological processes and fermentation stopping techniques that may be used prior and/or during a beverage production process. Secondly, there exist methods for removing alcohol from a produced beverage, which methods are relevant to the invention at hand. These methods are conceptually well-known from the prior art but some examples of them comprise adsorption (on resins, silica gels or zeolite) membrane filtrations, distillation techniques, spinning cone columns, freeze concentration, evaporation and extraction using organic solvent or supercritical solvent.

However, the many presented dealcoholization techniques relate to applications that are big in size and typically happen inside big industrial- or laboratory-grade production facilities. Hence, these methods are not in the grasp of ordinary consumers, restaurants and bars that are the end consumers of the alcoholic beverage. Further, current laws in many countries set strict rules on alcohol production and handling, which leaves dealcoholization practically only to the hands of the mentioned beverage producers.

The objective of the embodiments of the present invention is to at least alleviate one or more of the aforementioned drawbacks evident in the prior art arrangements particularly in the context of apparatuses and processes for dealcoholizing alcoholic beverages. The objective is generally achieved with an apparatus and a method in accordance with the claims.

The objective technical problem of the present invention is how to conveniently dealcoholize alcoholic beverage in household and restaurant conditions so that the ethanol content removed from the alcoholic beverage is forced to dilute to a fluid so that no ethanol distil may be manufactured with or taken out of the machine. An additional focus of the present invention is to carry out the dealcoholization such that the ethanol is removed from the alcoholic beverage with as gently as possible so as not to affect (e.g. by cooking or freezing) the complexion of the alcoholic beverage. It is common knowledge that wines and beers change their taste and complexion if heated too much.

Not letting out pure ethanol out of the apparatus serves two important functions. Stronger alcohol, especially ethanol distil, cannot be manufactured with the apparatus and no flammable and irritable ethanol gas is let out from the machine to the ambient air. Gaseous ethanol is highly flammable and therefore dangerous and furthermore also an inconvenience due to its pungent smell and therefore not letting it out of the apparatus in either gaseous or liquid form is important for the actual use of the apparatus. Further, in the present invention producing the vacuum via the cooling liquid forces the ethanol distil to dilute to said cooling liquid and consequently ethanol vapors cannot travel to the pump or otherwise out of the apparatus.

The primary advantage of the present invention is that it allows for dealcoholization of different ready-made alcoholic beverages in home conditions.

Another primary advantage of the present invention is that it doesn't ultimately produce any distil of pure ethanol but instead the ethanol vapors are directly condensed and diluted into a fluid. This is very important for home applications since the user cannot produce and consume any distil produce via usage of the present invention. Further, the aforementioned is achieved inherently by the interrelation and arrangement of the apparatus parts and consequently no filters or vessels for collecting ethanol distil are needed.

Even yet another advantage of the invention is that it especially allows for dealcoholization of wine with minimum effect to the taste, aroma and such essence of the wine. The process of dealcoholization is optimized to utilize the most suitable conditions for treating wine although similar beverages, such as beer, strong wines and the like may also be dealcoholized.

In accordance with one aspect of the present invention an apparatus for dealcoholizing alcoholic beverage comprising: a first receptacle comprising means to receive alcoholic beverage, a second receptacle comprising means to receive fluid, a third receptacle arranged to receive alcoholic beverage from the first receptacle, said third receptacle being further connected to the second receptacle, means for producing vacuum at least functionally connected to at least the third receptacle to lower pressure therein, fractionating means at least partially inside the second receptacle, the fractionating means functionally connecting the second and third receptacle, characterized in that the apparatus is arranged to facilitate vacuum distillation for the alcoholic beverage so that the vacuum is produced to the second receptacle and via the fractionating means to the third receptacle wherein vaporizing ethanol from the alcoholic beverage is forced to travel via the fractionating means to the second receptacle so that the vaporized ethanol is dissolved with the fluid in the second receptacle.

According to an exemplary embodiment of the present invention the alcoholic beverage is wine.

According to an exemplary embodiment of the present invention the first receptacle comprises or constitutes the third receptacle. According to another exemplary embodiment, the third receptacle is a separate receptacle from the first receptacle.

According to an exemplary embodiment of the present invention the fractionating means comprises a fractionating column. Further, the fluid in the second receptacle may be used to interact with the fractionating means for cooling the vapors in the column for condensing the vapors into liquid and further into the fluid itself. According to another exemplary embodiment of the present invention the fractionating means comprise an arrangement of an open fractionating column with a cap part over the fractionating column wherein the cap part provides the condensation surface for the ethanol vapors.

According to an exemplary embodiment of the present invention the apparatus comprises means for collecting first vapors of the vacuum distillation before the fractionating means or at the fractionating means. The first vapors may be directed to the first receptacle wherein they are mixed with fluid therein. The first vapors may be directed to the first receptacle via a diffuser, such as a micro bubble diffuser.

According to an exemplary embodiment of the present invention, the apparatus comprises means to heat the alcoholic beverage. The heating means may be preferably situated at the third receptacle to heat the contents therein.

According to an exemplary embodiment of the present invention, the apparatus comprises means to cool the second receptacle and/or liquid therein. This may be used to make the condensation more efficient in the fractionating means by cooling the fractionating means more efficiently. Both the amount and temperature of the cooling liquid may be set to be controlled in view of the preferred efficiency of condensation in the fractionating means.

According to an exemplary embodiment of the present invention the fractionating means comprise a two-phased mechanism wherein the first phase lets out first vapors of the vacuum distillation to another receptacle than the second receptacle and wherein the second phase directs ethanol vapor into the second receptacle. According to an exemplary embodiment of the present invention the fractionating means comprises a two-phased valve mechanism or conduit arrangement wherein the first phase lets out the first vapors from the vacuum distilled alcoholic beverage to the first receptacle and wherein the second phase directs ethanol vapor into the second receptacle. The actuation of the valve may be done with in relation to timing or target pressure, i.e. with a timer or in relation to the pressure change induced by the vacuum pump. Accordingly the first vapors, such as first volatile esters and the like forming in the early some 10-20 seconds in the treatment of the alcoholic beverage, may be directed to the first receptacle.

According to an exemplary embodiment of the present invention the dealcoholized alcoholic beverage may be flown from the third receptacle to the first receptacle after it has been dealcoholized. This may be used especially to mix a portion of dealcoholized alcoholic beverage with untreated alcoholic beverage. Additionally this may be used to cool down the dealcoholized alcoholic beverage and/or the mixture thereof.

According to an exemplary embodiment of the present invention the ethanol-fluid mixture is flown out from the second receptacle to the third receptacle and out of the apparatus after the dealcoholized alcoholic beverage has been flown from the third receptacle to the first receptacle. This may be used to wash the third receptacle. Furthermore, the ethanol-fluid mixture may also be conveyed throughout the conduits, valves and receptacles of the apparatus for cleaning the apparatus.

In accordance with one aspect of the present invention a method for dealcoholizing alcoholic beverage comprising: receiving alcoholic beverage in a first receptacle, receiving fluid in a second receptacle, determining if fluid is substantially non-alcoholic, setting the alcoholic beverage under lowered pressure and suitable temperature conditions to facilitate vacuum distillation, maintaining said pressure and temperature conditions for an amount of time to extract ethanol vapor from the alcoholic beverage, directing the resulting ethanol vapor into said second receptacle via fractionating means, cooling the ethanol vapor travelling via the fractionating means to create a liquid distillate, directing said liquid distillate from the fractionating means to the fluid in the second receptacle.

According to an exemplary embodiment of the present invention the method comprises a method item of determining the initial alcoholic beverage alcohol by volume (ABV).

According to an exemplary embodiment of the present invention the method comprises a method item of maintaining pressure and temperature conditions are for an amount of time in relation to a target alcohol by volume (ABV) of the alcoholic beverage, According to an exemplary embodiment of the present invention the vacuum distillation is carried out in a third receptacle.

According to an exemplary embodiment of the present invention wherein the target values of pressure and temperature produce vacuum distillation of ethanol-water solution, such that the ethanol is vaporized in temperature conditions of under 49° C.

According to an exemplary embodiment of the present invention first vapors comprising volatile components from the alcoholic beverage are not mixed with the fluid via the fractionating means but are directed and mixed with the non-dealcoholized alcoholic beverage.

The objective technical problem of the previously described method in accordance with the present invention is how to be able to dealcoholize different ready-made alcoholic beverages such that no pure ethanol distil is created as a result of the process. This is beneficial in view of household applicability since many countries do not allow manufacturing of alcohol at home.

The previously presented considerations concerning the various embodiments of the apparatus may be flexibly applied to the embodiments of the method mutatis mutandis and vice versa, as being appreciated by a skilled person.

As briefly reviewed hereinbefore, the utility of the different aspects of the present invention arises from a plurality of issues depending on each particular embodiment.

The term "exemplary" refers herein to an example or example-like feature, not the sole or only preferable option.

The terms "dealcoholization" and "dealcoholized" are used to refer to reducing the alcoholic (ethanol) content of an alcoholic beverage. The term pertains mainly to reducing the alcoholic content of an alcoholic beverage by lowering ethanol in the alcoholic beverage and the term is not meant to mean that the result of a dealcoholization should be a completely or even near completely ethanol free product although this may also be achieved.

The term "dissolve" is used to refer to dissolution and/or mixing of ethanol distillate or gaseous ethanol with a fluid.

Different embodiments of the present invention are also disclosed in the attached dependent claims.

BRIEF DESCRIPTION OF THE RELATED DRAWINGS

Next, some exemplary embodiments of the present invention are reviewed more closely with reference to the attached drawings, wherein FIG. 1 discloses an embodiment of the apparatus in accordance with the present disclosure.

DETAILED DESCRIPTION OF THE EMBODIMENTS

Figure 1:
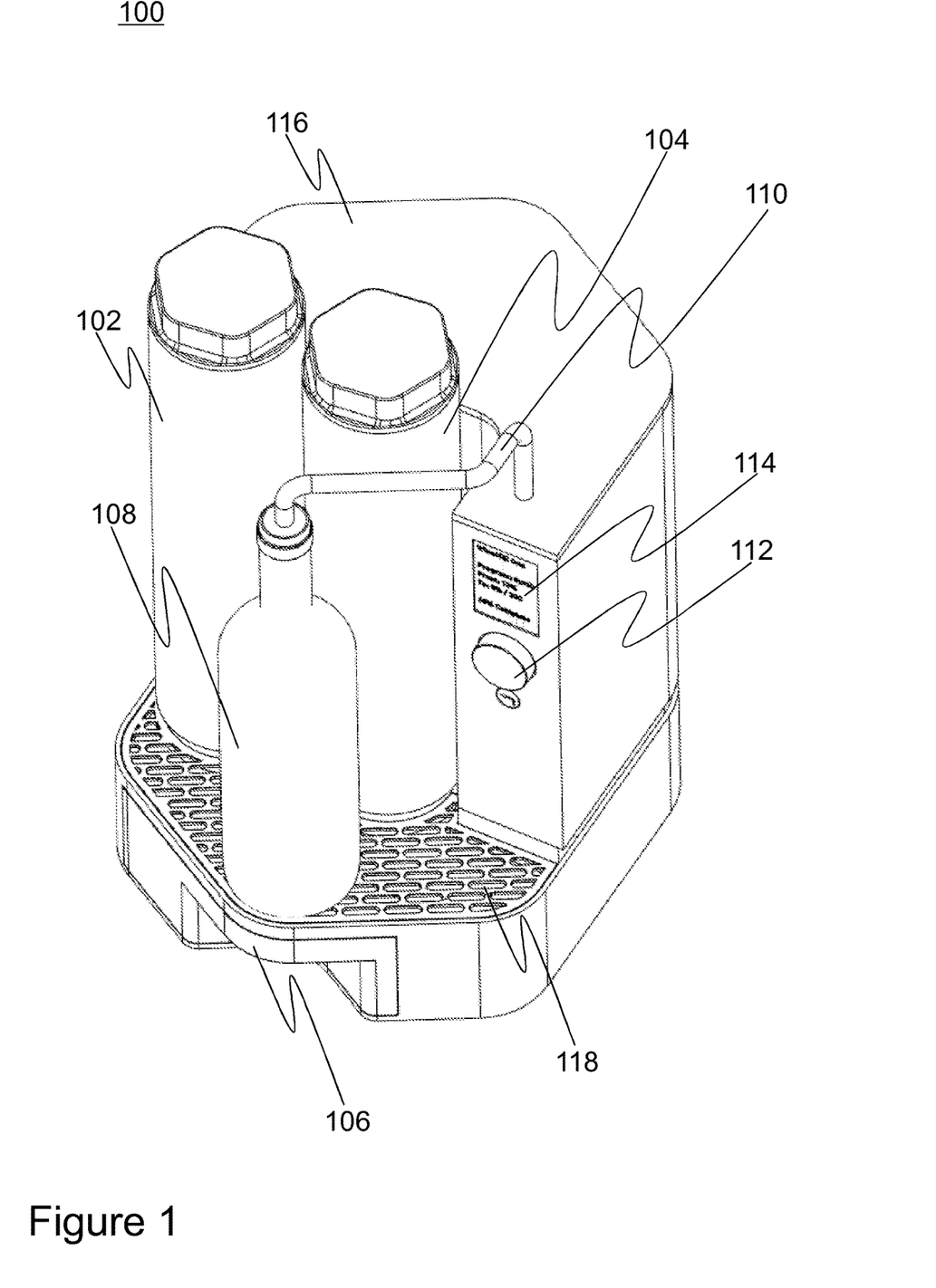

FIG. 1 discloses an embodiment of the apparatus 100 in accordance with the present invention.

The apparatus 100 essentially comprises a first receptacle 102, a second receptacle 104 and a third receptacle 106 between which fluids, such as water and alcoholic fluid, may be transported.

The first receptacle 102 is used to intake and contain alcoholic beverage that is to be dealcoholized. The first receptacle 102 preferably comprises a vacuum proof screw closure, cap, valve or other such vacuum proof means for receiving alcoholic beverage. The first receptacle 102 may also comprise a cooling coil, cooling loop(s) or other such arrangement for cooling fluid, such as alcoholic beverage. Other means for cooling the alcoholic beverage in the first receptacle 102 may comprise an inner receptacle inside the first receptacle 102, in which inner receptacle cold water or ice may be inserted. The cooling means may be removably connected to the first receptacle 102 and said means may comprise own conduits for circulating cooling fluid and/or ice thereof.

The second receptacle 104 preferably comprises a vacuum proof screw closure, cap, valve or other such vacuum proof means for receiving fluid. Preferably the fluid comprises water or other non-alcoholic fluid. However, from the technical viewpoint of the apparatus 100 also alcoholic fluid may be used in the second receptacle 104 if the device is used for fortifying said alcoholic fluid. The second receptacle 104 comprises also fractionating means at least functionally connected with the third receptacle 106. The fractionating means preferably comprise a fractionating column, which is at least partially inside the second receptacle 104, and which fractionating column is surrounded by fluid let in by aforesaid means. The fractionating column may comprise e.g. a Vigreux column. The fractionating column preferably comprises a condenser conduit or a cap part surrounding the column such that the ethanol vapors and condensate leaving the column is forced to travel into the surrounding fluid.

The third receptacle 106 is preferably used as wine boiling tank. Optionally additionally the third receptacle 106 may be used to store and dispose of the waste product of vaporized ethanol mixed with fluid at the second receptacle 104 via conveying said mixture from the second receptacle 104 to the third receptacle 106. The heating means and vacuum pump or aspirator means are situated in functional connection via the fluid circuit to the third receptacle 106.

The materials of the receptacles 102, 104, 106 are preferably polymer, plastic, glass, steel, aluminum or other such material or combination of such materials that is sufficiently alcoholic resistant. The receptacles 102, 104, 106 don't have to comprise same materials. At least the receptacles, which are put under vacuum should comprise vacuum-proof material, construction and sealing means at least such they may facilitate vacuum distillation conditions of preferably some 90-95% or 85-90%, or 95-99% Vacuum.

The apparatus 100 may also comprise means for transporting and/or dispensing fluid 110, such as a spout for dispensing dealcoholized beverage into an external receptacle 108, which may for example be a wine or beer bottle, glass or such container. An adjustable conduit may be also used to draw out liquid from the external receptacle 108.

The functions of the apparatus 100 may be controlled by input means 112, such as a rotatable and/or pushable knob. The settings of the apparatus 100 as well as the input for dealcoholization process may be provided via a display 114 or other such user interface means. In some cases, optionally or additionally the control means and interface means may be provided via a smartphone or computer. IoT means, such as M2M communication means, external servers and cloud computing means may be used for providing the apparatus 100 functions, controls and/or (user) interface thereof remotely for users.

The apparatus 100 may also comprise an enclosure 116 for protecting the fluid circuit, including conduits and receptacles, and plurality of components thereof. A drip tray 118 may also be utilized for collecting overflow and any drips that may incur during function of the apparatus 100.

FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. Further, the figure shows components to scale. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 2:
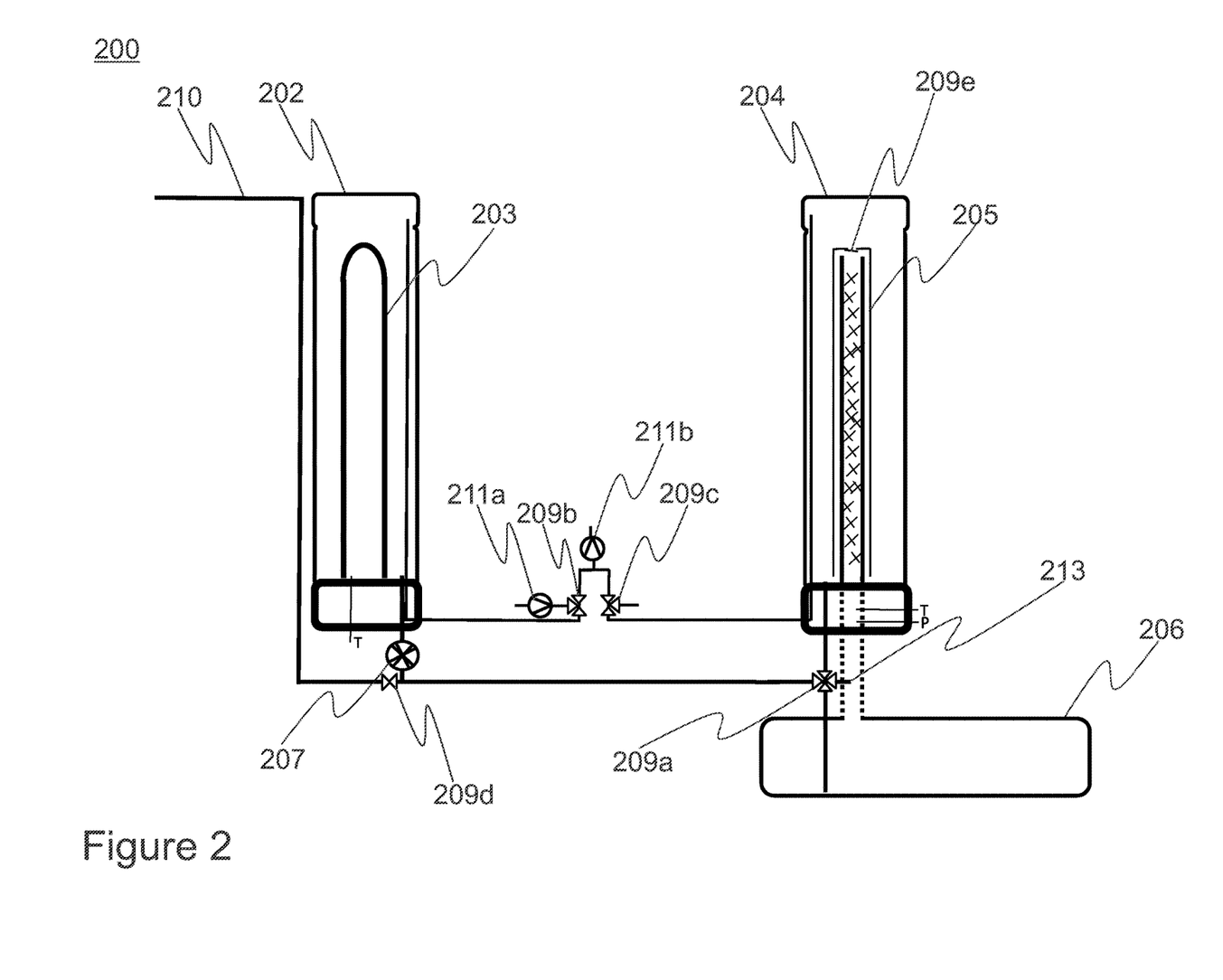
FIG. 2 is a diagrammatic illustration of an embodiment of the apparatus in accordance with the present disclosure.

FIG. 2 is a diagrammatic illustration of an embodiment of the apparatus 200 in accordance with the present invention.

The first receptacle 202 comprises means for taking in fluids and the first receptacle 202 is also connected via a conduit to a third receptacle 206, which conduit is controlled by a valve. The first receptacle 202 may also comprise cooling means 203. The first receptacle 202 may constitute a column with a screw closure or lid, which closure may be manually operated.

The cooling means 203 of the first receptacle 202 may be used to control alcoholic beverage temperature received in the first receptacle 202. Additionally, the cooling means may be also used to set the alcoholic beverage at a specific temperature for storing and/or serving. Additionally or conversely, the first receptacle 202 could also comprise heating and/or cooling means for controlling the temperature of the alcoholic beverage in the first receptacle 202. The cooling means 203 are beneficial for setting the temperature of the alcoholic beverage before serving, i.e. flowing the alcoholic beverage out of the apparatus 200, but such means may also be used to facilitate the vacuum distillation conditions. Also, the temperature of at least part of the alcoholic beverage may be raised in the vacuum distillation process to dealcoholize at least part of the alcoholic beverage and so the alcoholic beverage may be directed back to the first receptacle 202 after dealcoholization for cooling said beverage.

An amount of the alcoholic beverage, which has been poured e.g. by a user from the alcoholic beverage container to the first receptacle 202, is herein let via the control of the valve 209a to flow to third receptacle 206, optionally via operation of the pump 211a. A flowmeter 207 may be placed for detecting the amount of the alcoholic beverage that is flown to the third receptacle 206. In many instances it is beneficial to vacuum distil only a specific portion of the alcoholic beverage on top of which the amount of alcoholic beverage to be processed is needed to know to estimate and/or control the final alcoholic content of the vacuum distilled alcoholic beverage. This is especially important when only a portion of the alcoholic beverage is dealcoholized and then mixed with untreated alcoholic beverage in the first receptacle 202. However, the aforementioned considerations affect only the end alcoholic content of the end product and as such do not directly affect the mechanical functioning of the apparatus 200. The flow fluid from first receptacle 202 to third receptacle may be controlled by a valve 209a and pump 211a or 211b.

The second receptacle 204 is added water or such low-alcoholic or nonalcoholic fluid. Optionally, in some cases alcoholic fluid such as wine may also be used as the fluid in the second receptacle 204. The type of fluid may be chosen in light of the cooling properties of improving the solubility of the ethanol into said fluid. Preferably the amount of fluid is determined by the type and functioning of the fractionating means 205 as well as the preferred cooling efficiency of the fractionating means arrangement. Further, the amount of fluid may be determined also in view of the target ethanol content of cooling water or other fluid and extracted ethanol solution resultant of the vacuum distillation. The primary function of the fluid in the second receptacle 204 is to dilute the ethanol distil such as that no ethanol distil may travel out of the apparatus 200 or to the pump 211b. However, secondary optional function of the fluid in the second receptacle may be to use said fluid to cool the fractionating means 205 and to enable condensation of the ethanol vapors thereof.

In the third receptacle 206 the alcoholic beverage is brought to the vacuum distillation conditions by producing vacuum conditions to the second receptacle 204 and to the third receptacle 206, with the vacuum pump 211b, aspirator or such, via the valve 209c, and optionally by raising the temperature of the alcoholic beverage sufficiently and in accordance with the pressure therein to vaporize ethanol from the alcoholic beverage. In accordance with the present embodiment, the valves 209b and 209a would be closed during the vacuum distillation process so that the vacuum is first produced to the second receptacle 204 wherein the vacuum conditions are further conveyed to the third receptacle 206 via the fractionating means 205. The vaporized ethanol then rises to the fractionating means 205, herein depicted as an arrangement of fractionating column and a cap part surrounding the fractionating column (said cap part depicted as a cylinder closed from the other end and set over the fractionating column), which cap part around the column is further surrounded at least partly by the fluid added to the second receptacle 204 (said fluid not depicted). The ethanol vapors travel to the fractionating means 205 wherein they condensate on the fractionating means parts, such as a condenser conduit whose end is submerged in fluid of the second receptacle 204 or a cap part inner surface, wherein the condensating ethanol consequently moves down and is mixed with the fluid in the second receptacle 204 as a condensate liquid and/or directly dissolve with the surface of said fluid from the gas phase, i.e. the ethanol vapor. Some of the ethanol vapors may also travel directly to the fluid and through the fluid in the second receptacle 204 as bubbles but some amount of that is allowed as long as quantity of ethanol gas, e.g. bubbling from the liquid, doesn't grow too high. Such small quantities may be accounted for by filters or the like e.g. at the inlet valve 209c or at the vacuum pump 211b.

The fractionating means 205 of the FIG. 2 comprise essentially a column which is connected to convey vapors out of the third receptacle and an outer enclosing (cap part) which is situated around said column. The vapors travel via the column and condensate on the inner surface of the cap part of the fractionating means 205 wherefrom the condensate travels to the bottom limit of the cap part and to the space between the cap part and the second receptacle 204 where the condensate is mixed with the fluid therein. Due to the vacuum from the second receptacle 204 via the fluid and the space between the cap part and the second receptacle 204 the ethanol condensate is forced to travel to the fluid in the second receptacle 204 (the ethanol condensate essentially meet at some point a wall of fluid). Other structures to improve condensation in between the inner tube and the outer enclosure may be used. In view of the depicted fractionating means 205 comprising an arrangement of cap part and fractionating column, the fluid should be used preferably so much that even after producing the vacuum to the second receptacle 204, which causes the fluid level to rise, the cap part of the fractionating means 205 isn't completely submerged in the fluid. Producing the vacuum first to the second receptacle 204 and via the fractionating means 205 to the third receptacle 206 will cause the fluid to rise up in the second receptacle 204, which fluid is partly escaping from between the cap part and the fractionating column. This process will hence cause the fluid level to rise up outside of the fractionating means 205 against the cap part outer surface and consequently cause the fluid level to decrease inside the fractionating means as the fluid escapes out of the fractionating means 205 as mentioned. The aforementioned will in turn increase the inner volume that's free of fluid inside the fractionating means 205 causing a wider cap part outer area to be surrounded by fluid and a wider cap part inner surface are to be free from fluid, which in turn enable the ethanol vapors to condensate more efficiently on the surfaces between the cap part and the fractionating column (outer wall of said column). In other words, outside of the cap part (space in between the second receptacle 204 and cap part outer walls) of the fractionating means 205 the fluid level rises increasing the cooling area of the fractionating means at the inner space of the cap part (wall area next to the fractionating column) as the fluid level between the cap part and the column decreases due to the vacuum sucking the fluid in the direction of the vacuum pump, which is caused by the vacuum produced in the second receptacle 204 and to some degree the slightly higher pressure caused by the ethanol vaporizing in the third receptacle 206. Having a bigger space or area for the ethanol vapors to condensate is beneficial from the viewpoint that the ethanol enters the fluid as condensed liquid and not as gaseous ethanol.

The valve 209a may comprise a four way valve, the valve 209d may comprise a two way valve, such as a solenoid valve, and the valve 209c may comprise a three way valve with air relief, whereas the valve 209b may comprise a three way valve with air inlet and/or air relief.

A vacuum relief valve or vent 209e, such as a duckbill valve, may be also situated at the fractionating means 205. This is beneficial in some embodiments since the vacuum distillation reaction may cause a higher vacuum in the third receptacle 206 if the fluid in the third receptacle 206 cools off after terminating the vacuum distillation and/or malfunctioning of the vacuum pump due to electrical power failures or such. Differences in pressures may hence be accounted for without risking collapse or failure of the apparatus.

The vacuum distillation conditions preferred herein comprise maximum temperature of approximately 49° C. and corresponding vacuum in accordance with the temperature (different temperature conditions are possible). The fundamental concept and different feasible conditions for vacuum distilling an ethanol-water mixture (in accordance with an ethanol-water mixture phase diagram) are well known for a person skilled in the art. The upper limit of some 49° C. is a recognized upper limit for heating a wine without affecting it too much. Some exemplary vacuum distillation conditions comprise of preferably some 90-95% or 85-90%, or 95-99% Vacuum. The former two vacuum ranges may be suitable when heating means are used and the latter vacuum range may be used when there are no heating means present, such as when operating at ambient temperature. However, it is apparent for the present invention that such limit is not fixed but may be set at any preferred value. As depicted in the FIG. 2, the apparatus 200 may comprise temperature (T) and pressure (P) detection means at or in between the second and third receptacle as well as temperature detection means (T) at the first receptacle 202.

The third receptacle 206 may also be used to test the fluid in the second receptacle. A part of the fluid in the second receptacle 204 may be let into the third receptacle 206 via the valve 209a. A procedure for finding out if the fluid is water may be used and it may comprise the following steps:
1) a little amount, such as 3 cl of fluid is directed to the third receptacle 206,
2) the fluid is put under vacuum conditions and temperature is raised in the third receptacle 206,
3) said 3 cl of fluid is brought quickly to a boil and the temperature and pressure are monitored with the pressure and temperature sensors (P, T) or such means.

The fluid in the second receptacle may be also tested for ethanol content by a user, alcohol and extract meter or with a suitable sensor.

Additionally, the apparatus 200 may comprise means for collecting the first vapors that occur when the vacuum distillation conditions are produced without directing those first vapors through the cooling liquid. This is beneficial since the first vapors that occur as the vacuum distillation conditions are produced comprise esters and such volatile compounds that come of before and/or at the same time the ethanol starts to evaporate (e.g. some 20 seconds under the right conditions). These compounds (excl. the ethanol) have many properties in the wine including producing aroma, taste, etc. Therefore said volatile compounds may be directed via e.g. control of the valve 209a via conduit 213 (instead of the one going into the fractionating means) to transport the volatile compounds at the first receptacle 202 wherein the volatile compounds may be introduced to the fluid in the first receptacle 202. For example, a micro-bubble diffuser may be used for mixing volatile compounds with the fluid in the first receptacle 202 although a diffuser would require its own inlet.

After the vacuum distillation of alcoholic beverage in the third receptacle 206 has been carried out so that the alcoholic beverage has been dealcoholized (the target ABV being determined e.g. by a user) the dealcoholized fluid may be flown back to the first receptacle wherein it may be mixed with any fluid therein, such as an amount of the original untreated alcoholic beverage. The alcoholic beverage or such fluid in the first receptacle may be flown out via the valve 209d and dispensing means 210.

The ethanol-fluid mixture in the second receptacle 204 is preferably disposed e.g. by flowing said mixture to the third receptacle 206, which may be removed by a user for disposing of said mixture and cleaning. Optionally, the ethanol-fluid mixture may be directed via an output conduit and valve directly to a drain/outlet conduit that may be further directly connected to a sewer system. Hence, the user is left with a mild ethanol-water mixture, which they have to dispose of manually, or the apparatus 200 may dispose of said mixture automatically such that the user doesn't get to access the water-ethanol mixture at all.

A separate third receptacle 206 as illustrated in FIG. 2 is not mandatory although it has advantages. For example, only one cooling coil is needed for cooling the alcoholic beverage and the fluid in the second receptacle 204 because the wine may be pumped to the third receptacle during which the fluid from the second receptacle 204 may be directed to the first receptacle 202 for cooling after which said fluid may be directed back to the second receptacle 204 to provide cooling for liquefying the ethanol vapors in the fractioning means during vacuum distillation process. In contrast, having the third receptacle 206 inside or as part of the first receptacle 202 has the advantages that the system is simpler and the alcoholic beverage may be directly vacuum distilled in the first receptacle 202 reducing the need to move any fluids between receptacles 202, 204, 206.

Also, in some embodiments external container 108 such as the alcoholic beverage itself may be used as the first receptacle 202. Therein the conduits) itself may be inserted to the bottle and the vacuum distillation may be carried out by in the second receptacle 204 and third receptacle 206, which is in this embodiment a separate receptacle from the first receptacle 202, by limiting the vacuum only to said second 204 and third receptacle 206 by valve control.

It is apparent for a person skilled in the art that the receptacles and circuit system may be arranged in different ways and that the apparatus 200 embodiments of FIGS. 1 and 2 are merely exemplary embodiments in accordance with the present invention. For the invention at hand, clearly the function and their interrelated roles in the system for transporting and processing liquids and gases is essential and the invention should be understood in that light. To illustrate one feasible size for the apparatus 200 the first and second column may have a volume of e.g. 1600 ml-2000 ml (with column profiles as illustrated) and the third receptacle may have a volume of e.g. 1000 ml-1200 ml, which volumes are suitable for dealcoholizing typical wine bottles of 750 ml. Essentially, the apparatus 200 may be the size of a kitchen tabletop appliance. Clearly however, the present invention is scalable as a person skilled in the art will understand.

Figure 3:
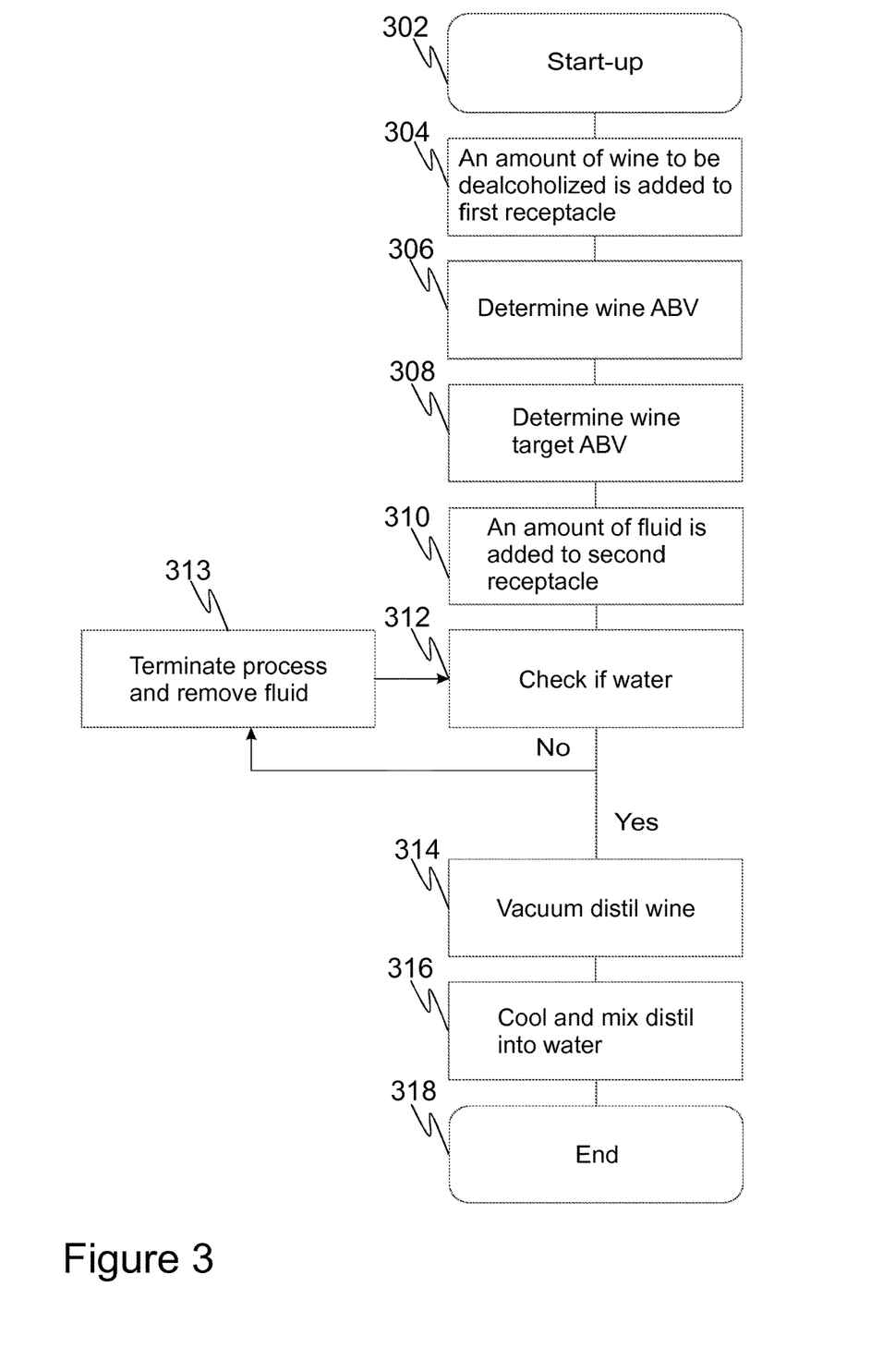
FIG. 3 illustrates an embodiment of a method for dealcoholizing alcoholic beverage in accordance with the present disclosure.

FIG. 3 is a block diagram illustrating an embodiment of the process of dealcoholizing wine in accordance with the present invention. Clearly, another beverage could be used but wine is used herein for more clear depiction of some of the exemplary apparatus function and functionalities.

At 302, referred to as the start-up the apparatus is set up, e.g. at least partially in relation to user input. The set up may comprise at least powering up the apparatus carrying out the dealcoholization process.

At 304, the user inserts an amount of wine to the apparatus for dealcoholization.

At 306, the wine ABV is determined, optionally via user input. The user may acquire the ABV from the original wine container for example.

At 308, the wine target ABV is determined, i.e. the ABV after the dealcoholization process. The target ABV may be predetermined or set by the user.

At 310, an amount of fluid is inserted to the apparatus, which fluid is added to a different place than the wine so as not to mix with the wine. Preferably the amount of fluid added to the device is at least the same as the amount of wine that has been added to the apparatus for dealcoholization.

At 312, the fluid added at 310 is checked to see whether it is suitable and at least substantially low-alcoholic or completely alcohol free fluid. The ethanol content of the fluid may be determined e.g. by a user, alcohol and extract meter or with a suitable sensor. At least it should be determined if there is any alcoholic content or in some instances it may also be determined how much alcoholic content there is in the fluid. In some cases the fluid may also comprise juice, tea, coffee or such. If it is determined that the fluid comprises non-suitable substance, such as ethanol-water mixture, the process is terminated as long as a new fluid is added and tested in accordance with items 310 and 312. If water or such suitable non-alcoholic fluid is detected the process continues to item 314.

At 314, the wine is moved e.g. with vacuum pump suction to a space wherein it may be vacuum distilled. The wine volume is preferably monitored by a flowmeter. The water is also brought under a vacuum and its volume may be determined. If too little water is detected, such as less water than the monitored wine volume, more water may be requested for controlling the process. The water may also be cooled preferably until some 8-10° C. for facilitating better liquefying of ethanol vapors travelling in the fractionating means.

A portion of the wine may be placed to a place wherein that portion is not put under vacuum distillation process. Such non-treated amount may be also cooled. The amount of wine to be dealcoholized is put under vacuum conditions at some 90-95% Vacuum and to temperatures of some 35-40° C. and in no case preferably higher than 49° C., which temperature has been identified in some instances as a temperature beyond which higher temperatures cause degrading of the wine quality. Alternatively, Vacuums of 85-90%, or 95-99% may also be used. In a broader sense, a person skilled in the art will understand the different feasible conditions in accordance with vacuum distillation.

At 316, the ethanol evaporates and travels via fractionating means wherein cooling non-alcoholic fluid interacting with the fractionating means liquefies the ethanol vapor, which liquefied ethanol distillate then is forced to travel via the fractionating means to the water. Optionally and/or addition-ally the ethanol vapor may also directly travel via the fractionating column to or close to the water surface where it condensates directly to the water. In some instances some of the ethanol may travel through the water as bubbles but this may also be accounted for as explained hereinbefore.

At 318, after a specific amount of ethanol (in accordance with the target ABV and the possible amount of untreated wine in another container) has been removed from the wine the vacuum is released and the dealcoholized wine may be pumped to another container. Therein the dealcoholized wine may be mixed with the untreated wine. Therewith the cooling may be further used to attain a specific temperature for dispensing and consumption or for storing and preserving the wine.

The wine may also be brought under vacuum for improving the storing conditions and preservation of the wine.

The ethanol-water mixture, which is seen as a waste product, may be directed to a drain outlet or it may be left to be disposed of by the user. However, the mixture cannot be higher in ABV the original wine and in practice it is always considerably lighter so the user is not left with any-thing higher in ABV than the starting wine.

The scope of the invention is determined by the attached claims together with the equivalents thereof. The skilled persons will again appreciate the fact that the disclosed embodiments were constructed for illustrative purposes only, and the innovative fulcrum reviewed herein will cover further embodiments, embodiment combinations, variations and equivalents that better suit each particular use case of the invention

The invention claimed is:

1. An apparatus for dealcoholizing alcoholic beverages comprising:
   a first receptacle to receive an alcoholic beverage;
   a second receptacle to receive fluid to dilute ethanol extracted from the alcoholic beverage;
   a third receptacle at least functionally connected to the first receptacle to receive the alcoholic beverage from the first receptacle, said third receptacle being further connected to the second receptacle;
   a vacuum pump at least functionally connected to at least the third receptacle to lower pressure therein; and
   a fractionator at least partially inside the second receptacle, the fractionator functionally connecting the second receptacle to the third receptacle;
   wherein the apparatus is arranged to facilitate vacuum distillation for the alcoholic beverage so that vacuum is applied to the second receptacle and via the fractionator applied to the third receptacle, and wherein vaporized ethanol from the alcoholic beverage is forced to travel via the fractionator to the second receptacle so that the vaporized ethanol is dissolved with the ethanol diluting fluid in the second receptacle.

2. The apparatus according to claim 1, wherein the first receptacle comprises the third receptacle.

3. The apparatus according to claim 1, wherein the third receptacle is a separate receptacle from the first receptacle.

4. The apparatus according to claim 1, wherein the fractionator comprises a fractionating column.

5. The apparatus according to claim 1, wherein the fractionator comprises an arrangement of an open fractionating column with a cap part over the fractionating column, the cap part providing a condensation surface for ethanol vapors.

6. The apparatus according to claim 1, further comprising collecting first vapors of the vacuum distillation before the fractionator or at the fractionator.

7. The apparatus of claim 6, wherein the collected first vapors are guided to the first receptacle and mixed with fluid therein.

8. The apparatus of claim 6, wherein the first vapors are directed to the first receptacle via a diffuser, the diffuser including a micro bubble diffuser.

9. The apparatus of claim 1, further comprising heating means to heat the alcoholic beverage.

10. The apparatus of claim 9, wherein the heating means is situated at the third receptacle to heat contents therein.

11. The apparatus of claim 1, further comprising cooling means to cool the second receptacle and/or liquid therein.

12. A method for dealcoholizing alcoholic beverages using the apparatus of claim 1, comprising:
  receiving an alcoholic beverage in the first receptacle;
  receiving a fluid in the second receptacle; and
  if the fluid is substantially non-alcoholic,
    setting the alcoholic beverage under lowered pressure and suitable temperature conditions to facilitate vacuum distillation;
    maintaining the lowered pressure and suitable temperature conditions for an amount of time to extract ethanol vapor from the alcoholic beverage;
    directing the extracted ethanol vapor into the second receptacle via the fractionator;
    cooling the ethanol vapor travelling via the fractionator to create a liquid distillate; and
    directing the liquid distillate from the fractionator to the second receptacle.

13. The method of claim 12, further comprising determining an alcohol by volume (ABV) of the alcoholic beverage.

14. The method of claim 13, further comprising maintaining pressure and temperature conditions for an amount of time in relation to a target ABV of the alcoholic beverage.

15. The method of claim 12, wherein the vacuum distillation is carried out in the third receptacle.

* * * * *